Jan. 15, 1952     L. GAILLOUD     2,582,324
APPARATUS FOR MEASURING THE HEAT SUPPLIED BY
A FLOW OF LIQUID AT VARIABLE TEMPERATURE
Filed June 2, 1948     4 Sheets-Sheet 1
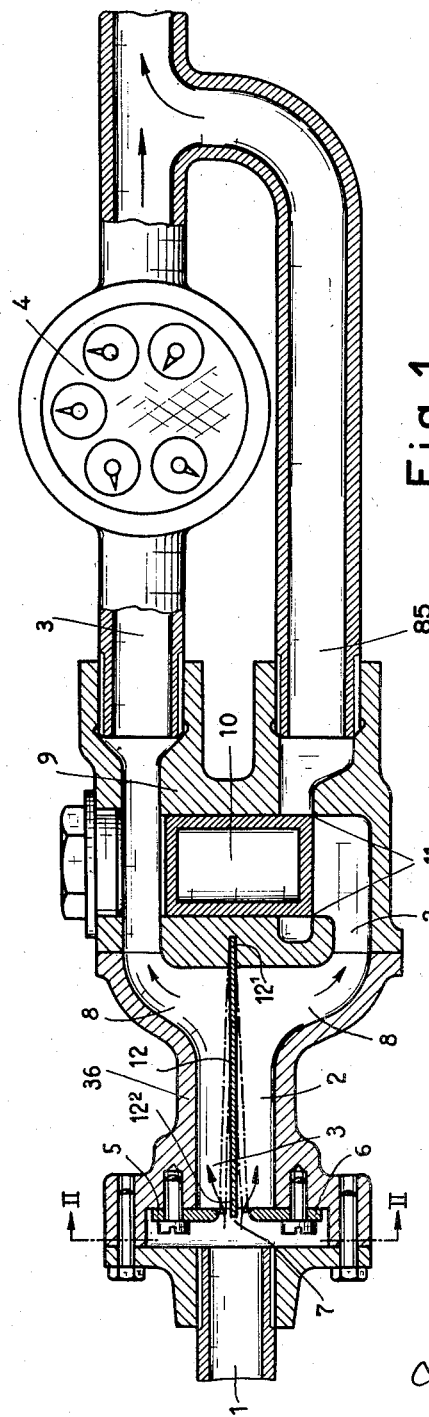
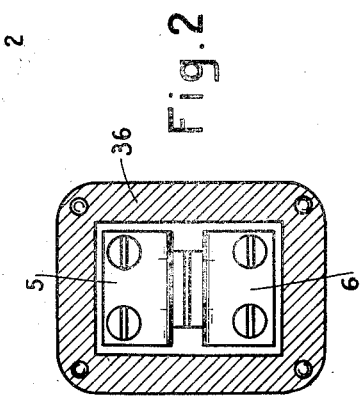

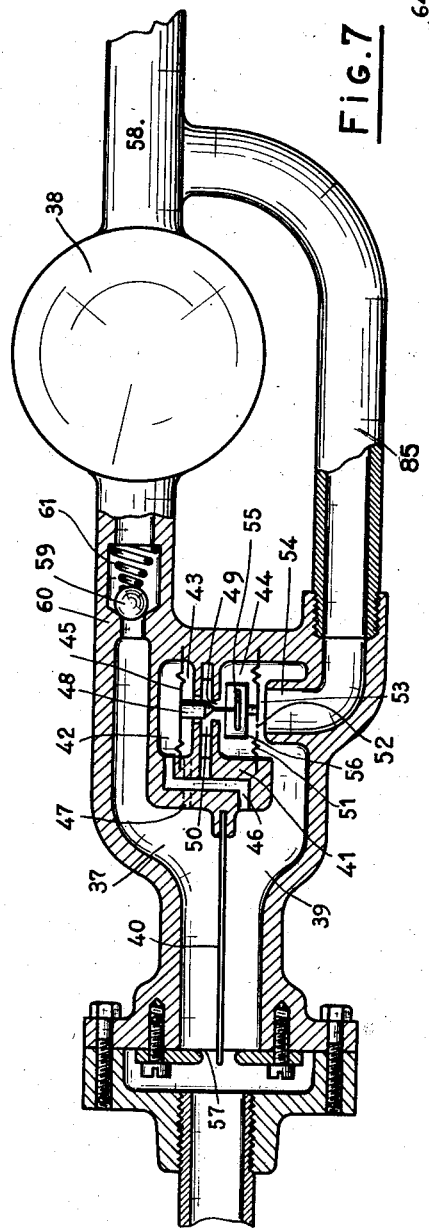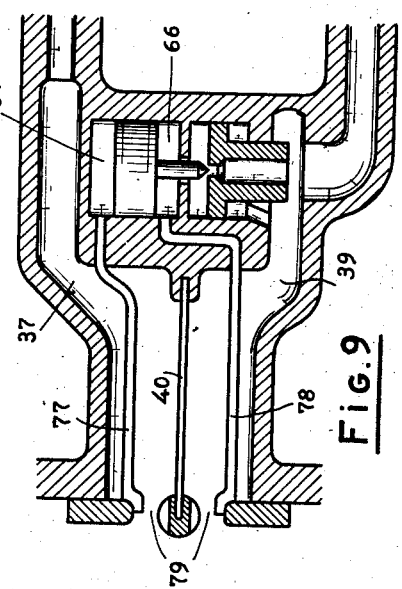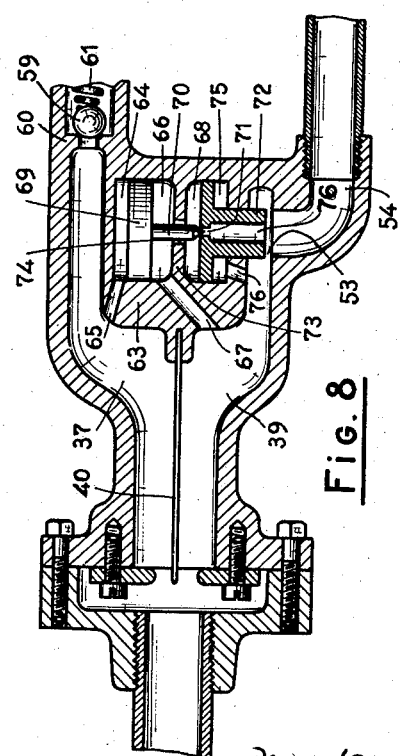

Patented Jan. 15, 1952

2,582,324

UNITED STATES PATENT OFFICE 2,582,324

APPARATUS FOR MEASURING THE HEAT SUPPLIED BY A FLOW OF LIQUID AT VARIABLE TEMPERATURE

Louis Gailloud, Geneva, Switzerland

Application June 2, 1948, Serial No. 30,706
In Switzerland June 3, 1947

17 Claims. (Cl. 73—193)

1

The present invention relates to apparatuses for measuring the amount of heat supplied by a flow of liquid at variable temperature.

According to an important feature of the invention the apparatus comprises an obturator the regulation of which is effected by the variations in temperature of the liquid, and which is designed to direct a part of the liquid into a conduit leading to an ordinary volumetric meter, the remainder of the liquid passing through a by-pass, the pressures in the by-pass and in the conduit leading to the meter being maintained constantly equal by a pressure-balancer, so that the quantity of liquid passing through the volumetric meter be directly proportional to the temperature of the liquid.

The accompanying drawings represent by way of example several forms of construction of the apparatus embodying the invention.

Figure 1 shows the first form of construction of the apparatus in sectional elevation;

Figure 2 shows a cross section on the line II—II of Figure 1;

Figure 7 shows in sectional elevation a fourth form of construction of the apparatus; and Figures 8 and 9 show in sectional elevation details of two alternative forms of this fourth form of construction.

Figure 3:
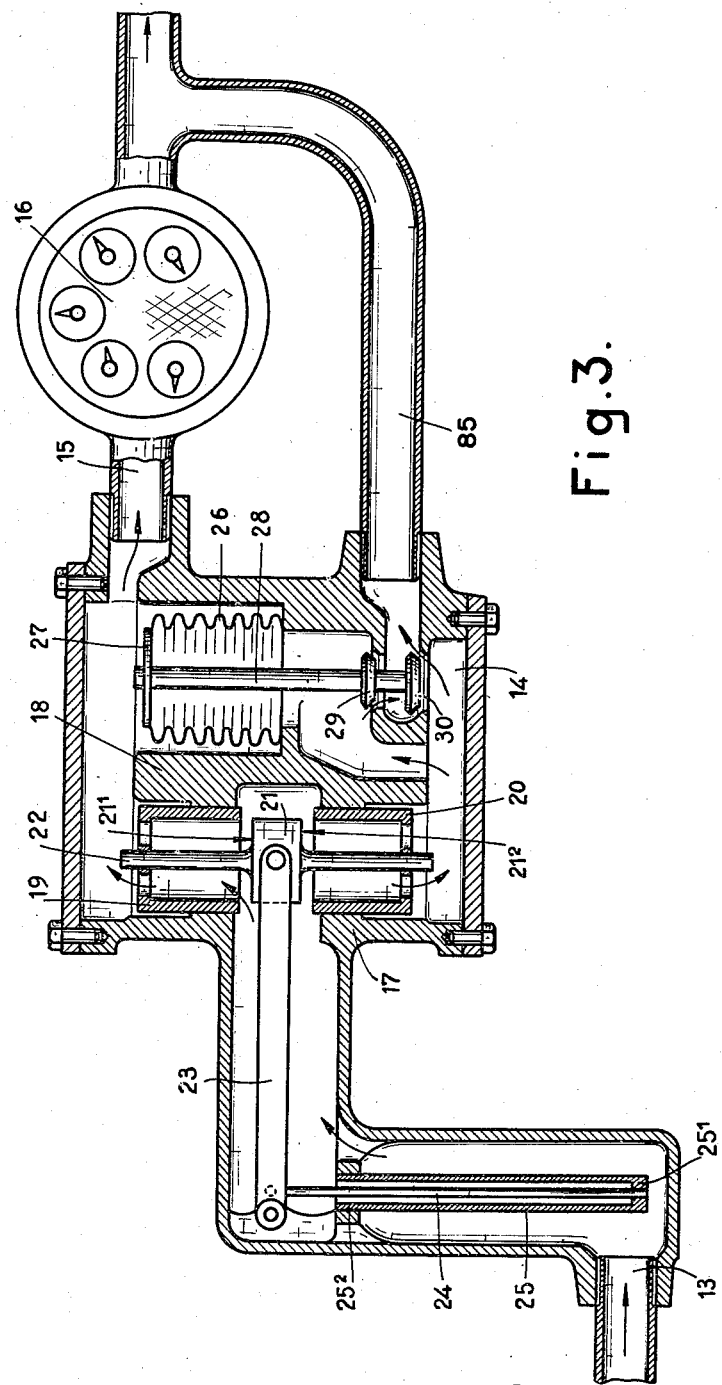
Figure 3 shows a second form of construction of the apparatus in sectional elevation.

In the form of construction represented by Figures 1 and 2, the apparatus comprises a conduit 1 for supplying the liquid, followed by a conduit 36 forming a by-pass 2, and a conduit 3 leading to an ordinary volumetric meter 4. The by-pass 2 is provided with a tube 85 rejoining the main conduit 3 beyond the meter 4. The mouth of the conduit 36 is provided with two adjustable baffle plates 5 and 6 forming between them an opening 7. This conduit 36, of rectangular cross section, then opens out into a cavity 8. The cavity 8 contains a pressure-balancer, the body 9 of which contains a piston 10 of the same weight as the liquid which it displaces and capable of obturating or shutting the orifice 11 of the by-pass. On the body 9 of the balancing arrangement, facing the opening 7, is fixed the end $12^1$ of a bi-metallic strip 12 extending over the whole width of the con-

2 duit 36 and separating into two parts the cavity 8, thus forming the by-pass 2 and the conduit 3. The free end of the strip 12, denoted by $12^2$, is located between the baffle plates 5 and 6, and moves closer to one or the other according to the temperature of the liquid. The position of the baffle plates can be regulated according to the maximum and minimum temperatures at which the apparatus is called upon to work.

The apparatus operates as follows:

When the liquid is at the minimum temperature, the strip 12 presses on to the baffle plate 5 and closes the conduit leading to the meter 4. All the liquid passes through the by-pass 2, and nothing is registered or recorded. The opposite occurs when the liquid is at the maximum temperature and the strip 12 presses upon the baffle plate 6. For any intermediate temperature of the liquid the free end $12^2$ of the strip 12 occupies a corresponding intermediate position between the baffles 5 and 6. It is sufficient that the pressures in the cavity 8 should be equal on either side of the strip 12 for the quanitty of liquid passing through the meter to be proportional to the temperature. This condition is fulfilled owing to the balancer, the piston 10 of which is in suspension inside the body 9. As soon as the pressure increases, for example, in the meter, the piston 10 is urged downwards. The movement of the piston 10 constricts the opening 11, so that the liquid flows out less easily and the pressure at 2 under the strip rises until equilibrium is restored.

This arrangement enables the meter 4 to register or record the amount of heat brought by a current the flow and temperature of which may both be variable. It is sufficient to multiply the volumetric indication of the meter 4 by a constant appropriate to the apparatus in order to obtain the result in thermal units. This constant is the number of degrees of variation in temperature corresponding to the distance between the two baffle plates 5 and 6. The scale of the meter could be graduated so that it indicates this result directly.

The second form of construction differs from the first one through the obturator and the arrangement for balancing the pressure.

In Figure 3, 13 denotes the conduit for supplying the liquid, 14 the by-pass, and 15 the conduit leading to the volumetric meter 16. The body of the apparatus is denoted by 17, and that of the balancing arrangement by 18. Two valve seats 19 and 20 are fixed in the body 17. The position of these seats can be modified according to the differences of temperature between which the apparatus has to work. The obturator comprises a valve 21, of which one face 21¹ cooperates with the seat 19 and the other face 21² with the seat 20. This valve is mounted on a rod 22 capable of being displaced axially. This valve is connected by a lever 23 and a rod 24 having a small coefficient of expansion to the free end 25¹ of a tube 25 with a high coefficient of expansion, the other end of which, denoted by 25², is fixed to the frame. The variations in length of the tube 25 due to variations in the temperature of the liquid produce through the medium of lever 23 an axial displacement of the rod 22 carrying the valve 21. This valve opens to a greater or lesser extent the by-pass 14 or the conduit 15. The pressure-balancing arrangement for keeping the pressures equal in the by-pass 14 and the conduit 15 comprises a diaphragm such as an aneroid capsule 26 fixed at one end to the body 18 and at the other end to a disc 27 rigidly connected with a rod 28 carrying a double compensated valve 29, 30, for regulating the flow of the liquid from the by-pass.

The principle of operation of the apparatus is identical with that of the first form of construction.

Figure 4:
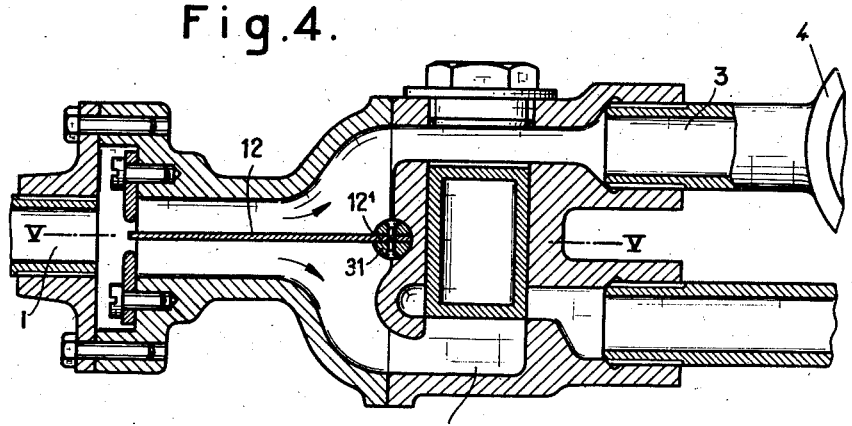
Figure 4 shows a detail of a third form of construction of the apparatus in sectional elevation.
Figure 5:
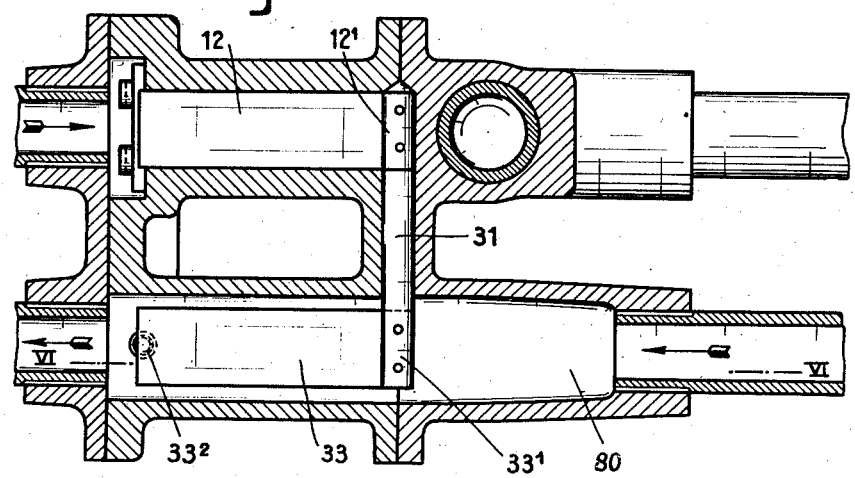
Figure 5 shows a section in plan, on the line V—V in Figure 4.
Figure 6:
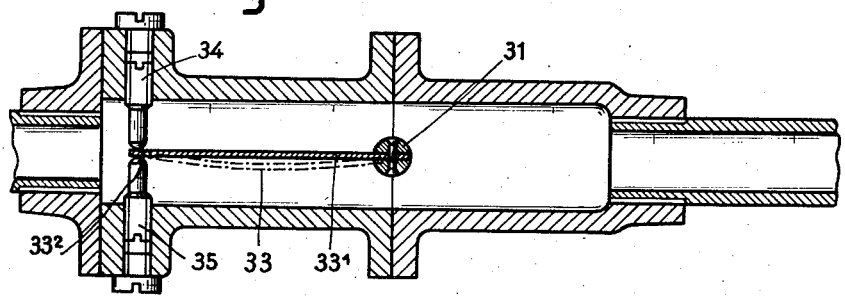
Figure 6 shows a section in elevation on the line VI—VI in Figure 5.

The apparatus according to the third form of construction, as shown in Figures 4, 5 and 6, is for measuring the amount of heat supplied to a liquid by a boiler, for example, allowance being made for the fluctuations in temperature of the feed liquid.

For this purpose a compensating arrangement is added to an apparatus similar to the first form of construction, differing however from the latter by the manner of fixation of the end 12¹ of the bimetallic strip 12. This end 12¹ is mounted in the one extremity of a rod 31, the other extremity of which emerges from the body of the apparatus and extends into the feed conduit 80 of the boiler. There, a second bimetallic strip 33 immersed in the feed liquid is fixed by one end 33¹ to the rod 31. Its other end 33² is so gripped between two adjustable stops or abutments 34 and 35 as just to be able to slide between them. The bimetallic strips 12 and 33 are of the same characteristic. Fluctuations in temperature of the feed liquid constrain the strip 33 to bend to a greater or lesser extent, causing the rod 31 to turn slightly, and thus displacing the strip 12 by a corresponding amount. In this way, a surplus of heat furnished by the boiler owing to a fall in the temperature of the feed liquid is automatically registered or recorded by the meter 4.

In Figure 7, 37 designates the conduit leading to the conventional volumetric meter denoted by 38; 39 denotes the by-pass, and 40 the bimetallic strip. The balancing arrangement comprises a body 41 situated between the conduit 37 and the by-pass 39. Three chambers denoted by 42, 43 and 44 are formed in this body 41. The first two chambers, 42 and 43, are separated from one another by a movable partition 45, formed by a resilient diaphragm. The chamber 42 is connected to the by-pass 39 by a channel 46, and the chamber 43 is connected to the conduit 37 by a channel 47. For the pressures in the conduit 37 and in the by-pass 39, to be equal, they will also have to be equal in the chambers 42 and 43. A needle valve 48 is fixed to the diaphragm 45. This needle valve can at least partially shut off an orifice or passage 49 admitting the liquid into the chamber 44, the liquid having been obliged to pass into an intermediate space or chamber denoted by 50. The chamber 44 is bounded by a resilient diaphragm 51 pierced with a small hole 52, permitting communication between chamber 44 and chamber 54. This diaphragm can mask or cover at least partially a flow-off orifice or passage 53 from the by-pass, the second part of which, situated beyond the passage 53, is marked 54. The diaphragm 51 thus constitutes a member for regulating the flow from the by-pass. In order to obviate hunting in the system and to stabilise it, a damper is provided, comprising a piston 55 which is rigidly connected with the needle valve 48 and is displaced in a cylinder 56 solidly connected with the diaphragm 51.

The operation of this balancing arrangement is as follows:

In a state of equilibrium, the position of the diaphragm 45 is such that the water which the needle valve 48 allows to pass under the effect of the difference in pressure between the chambers 50 and 44 is equal to that which flows through the hole 52 under the action of the difference in pressure between the chambers 44 and 54. The pressure in the chamber 44 is thus the mean between those of the chambers 50 and 54.

For example, if the pressure in the conduit 37 is stronger or higher than that in the by-pass 39, the pressure also rises in the chamber 43 and pushes the diaphragm 45 and the needle valve 48, which latter opens the passage 49, which causes the pressure in the chamber 44 to rise. This pressure pushes against the diaphragm 51 and somewhat constricts the pasage 53 until equilibrium is re-established between the conduits 37 and 39.

If on the other hand, the pressure is higher in the by-pass 39, the reverse phenomenon takes place.

When the water is cold, however, and the inlet of the conduit 37 is closed by the strip 40, the drop in pressure between the points 57 and 58 in the circuit passing through the meter is practically zero, whereas the drop in pressure in the circuit of the by-pass is a maximum. Under these circumstances the pressure-balancing arrangement cannot suitably restore equilibrium. It is recommended to add a valve formed by a ball 59 applied against its seat 60 by a spring 61, the resistance of this valve being at least equal to the maximum resistance of the by-pass.

In the alternative form illustrated in Figure 8, the body of the balancing arrangement is denoted by 63, the first chamber by 64, which communicates with the conduit 37 through a channel 65, the second chamber by 66, which communicates with the by-pass 39 through a channel 67, and the third chamber by 68. The chambers 64 and 66 are separated by a piston 69, which carries a needle valve 70, which can at least partially close a flow-off opening 71 formed in a piston 72, which limits the chamber 68. The piston 72 is differential, having two diameters, which are such that the ratio between the areas of the corresponding surfaces is 1:2. The piston 72 can at least partially shut off the flow-off passage 53 from the by-pass.

A fixed wall 73 separates the chambers 66 and 68. A hole 74 formed in the centre of this wall allows the needle valve 70 to pass with a slight clearance, permitting communication between the two chambers 66 and 68. The piston 72, on being displaced, closes to a greater or lesser degree the flow-off passage 53 from the by-pass.

In the state of equilibrium, a small amount of water passes through the conduit 67, the chamber 66, the hole 74, the chamber 68 and the orifice 71. The pressures in the conduit 37 and in the chamber 64 are equal, as are also the pressures in the by-pass 39 and in the chamber 66. The pressure in the chamber 68 is the mean between those of the chambers 66 and 75, 75 denoting the space situated under the part of large diameter of the piston 72 and communicating with the by-pass through a channel 76.

If the pressure in the conduit 37 becomes higher than that in the by-pass 39, a thrust is exerted upon the piston 69, which through its needle valve 70, closes the orifice 71 a little further. The pressure in the chamber 68 rises and exerts a thrust upon the piston 72, which constricts the passage 53 and causes the pressure in the by-pass to rise again until equilibrium with the conduit 37 is re-established. The spring-loaded ball valve 59 is also provided, for the same reasons as in the case of Figure 7.

The conditions of flow not being, for all the positions of the strip 40, rigorously proportional to the falls of pressure, it is possible to obtain an apparatus which is still more accurate by connecting the chambers 64 and 66 (or 42 and 43 in Figure 7) to Pitot tubes, denoted by 77 and 78 in Figure 9, the opening of which is placed just at the point of maximum constriction designated by 79. The pressures are still utilised, but the two speeds of flow, which have to be identical, are measured.

What I claim is:

1. An apparatus for measuring the heat supplied by a flowing liquid of variable temperature comprising a conduit for supplying the liquid of variable temperature, a first conduit leading to a conventional volumetric meter, followed by a main conduit, a by-pass leading from said supply conduit to said main conduit beyond said volumetric meter, an obturator directing part of the flowing liquid into said first conduit and the rest into said by-pass, said obturator being responsive to the variations in the temperature of the liquid, and pressure-balancing means interposed between said first conduit and said by-pass, to keep the pressure in said first conduit and in said by-pass constantly equal to one another, whereby the quantity of liquid passing through said volumetric meter and measured therein will be directly proportional to the temperature of said liquid.

2. An apparatus for measuring the heat supplied by a flowing liquid of variable temperature comprising a conduit for supplying the liquid of variable temperature, a first conduit leading to a conventional volumetric meter followed by a main conduit, a by-pass leading from said supply conduit to said main conduit beyond said volumetric meter, a bimetallic strip placed in said liquid supplying conduit parallel to the current and fixed by one of its ends so as to direct part of the flowing liquid into said first conduit and the rest into said by-pass, the position of the free end of said bimetallic strip varying with the temperature of the flowing liquid, and pressure-balancing means interposed between said first conduit and said by-pass to keep the pressure in said first conduit and in said by-pass constantly equal to one another, whereby the quantity of liquid passing through said volumetric meter and measured therein will be directly proportional to the temperature of said liquid.

3. An apparatus for measuring the heat supplied by a flowing liquid of variable temperature comprising a first feeding conduit for supplying the liquid of variable temperature, a first conduit leading from said first feeding conduit to a conventional volumetric meter followed by a main conduit, a by-pass leading from said first feeding conduit to the said main conduit beyond said volumetric meter, a second feeding conduit for supplying liquid to said first feeding conduit, a rotatable rod between said first and said second feeding conduits, a first bimetallic strip placed in said first liquid feeding conduit parallel to the current and having one of its ends fixed to said rotatable rod and its other end free, the position of the free end of said first bimetallic strip varying with the temperature of the flowing liquid so as to direct a variable part of the flowing liquid into said first conduit and the rest into said by-pass, a second bimetallic strip placed in said second feeding conduit and having one of its ends fixed to said rotatable rod and its other end longitudinally guided so as to rotate said rod responsive to the variations in temperature of the liquid flowing in said second feeding conduit and pressure-balancing means interposed between said first conduit and said by-pass to keep the pressure in said first conduit and in said by-pass constantly equal to one another, whereby the quantity of liquid passing through said volumetric meter and measured therein will be directly proportional to the temperature of said liquid, and allowance being made for the fluctuations in temperature of the liquid fed by said second feeding conduit.

4. An apparatus of the character described as claimed in claim 1, wherein the obturator comprises in combination a double valve adapted to open the by-pass while closing the first conduit leading to the volumetric meter, and conversely, and a metallic tube partially secured in said supply conduit so that the thermal variations of the flowing liquid in said supply conduit determine longitudinal expanding or contracting of said tube with respect to said supply conduit, and controlling means connected to said tube and to said double-valve so as to actuate the same.

5. An apparatus of the character described as claimed in claim 1, wherein the pressure-balancing means comprises a piston whose specific gravity is equal to that of the flowing liquid, said piston being displaceable in a conduit connecting the by-pass to the first conduit leading to the volumetric meter, and being adapted to obturate at least partially the by-pass.

6. An apparatus of the character described as claimed in claim 1, wherein the by-pass is formed with an up-stream portion and a down-stream portion connected by a double valve seating, and wherein the pressure-balancing means comprises, in combination, a body provided with a crossing-passage disposed between said first conduit and said up-stream portion of the by-pass, a supple diaphragm tightly fitted in said passage and a double compensated valve connected to said diaphragm so as to be controlled by the same, said compensated valve being adapted to cooperate with said double valve seating in order to obturate at least partially the by-pass between its up-stream and down-stream portions.

7. An apparatus of the character described as claimed in claim 1, wherein the pressure-balancing means comprises two chambers, one of which is connected to the first conduit leading to the volumetric meter, while the other one is connected to the by-pass, a movable partition separating said two chambers, a third chamber having an orifice, means controlled by the displacements of said movable partition for obturating to a greater or less extent said orifice, and a regulating member adapted to obturate at least partially the outlet from said by-pass, whereby when the variations of opening of said orifice produce variations of pressure in said third chamber, said variations in pressure actuate said regulating member so that variations of pressure in said by-pass result in variations of flow in said first conduit, and vice versa.

8. An apparatus of the character described as claimed in claim 1, wherein the pressure-balancing means comprises two chambers, one of which is connected to the first conduit leading to the volumetric meter, while the other one is connected to the by-pass, a movable partition separating said two chambers, a third chamber having an orifice, a needle valve carried by said movable partition for obturating at least partially said orifice of said third chamber, and a regulating member adapted to obturate at least partially the outlet from said by-pass, whereby when the variations of opening of said orifice produce variations of pressure in said third chamber, said variations in pressure actuate said regulating member so that variations of pressure in said by-pass result in variations of flow in said first conduit, and vice versa.

9. An apparatus of the character described as claimed in claim 1, wherein the pressure-balancing means comprises two chambers, one of which is connected to the first conduit leading to the volumetric meter, while the other one is connected to the by-pass, a movable partition separating said two chambers, a third chamber having an admission orifice communicating with one of these first chambers, a needle valve carried by said movable partition for obturating at least partially said admission orifice of said third chamber, and a regulating member adapted to obturate at least partially the outlet from said by-pass, whereby when the variations of opening of said admission orifice produce variations of pressure in said third chamber, said variations in pressure actuate said regulating member so that variations of pressure in said by-pass result in variations of flow in said first conduit, and vice versa.

10. An apparatus of the character described as claimed in claim 1, wherein the pressure-balancing means comprises two chambers, one of which is connected to the first conduit leading to the volumetric meter, while the other one is connected to the by-pass, a movable partition separating said two chambers, a third chamber having a flow-off orifice communicating with said by-pass, a needle valve carried by said movable partition for obturating at least partially said flow-off orifice of said third chamber, and a regulating member adapted to obturate at least partially the outlet from said by-pass, whereby when the variations of opening of said flow-off orifice produce variations of pressure in said third chamber, said variations in pressure actuate said regulating member so that variations of pressure in said by-pass result in variations of flow in said first conduit, and vice versa.

11. An apparatus of the character described as claimed in claim 1, wherein the pressure-balancing means comprises two chambers one of which is connected to the first conduit leading to the volumetric meter, while the other one is connected to the by-pass, a movable diaphragm separating said two chambers, a third chamber having an orifice, means controlled by said diaphragm for obturating at least partially said orifice, and a regulating member adapted to obturate at least partially the outlet from said by-pass, whereby when the variations of opening of said orifice produce variations of pressure in said third chamber, said variations in pressure actuate said regulating member so that variations of pressure in said by-pass result in variations of flow in said first conduit, and vice versa.

12. An apparatus of the character described as claimed in claim 1, wherein the pressure-balancing means comprises two chambers, one of which is connected to the first conduit leading to the volumetric meter, while the other one is connected to the by-pass, a movable piston separating said two chambers, a third chamber having an orifice communicating with said by-pass, means controlled by said piston for obturating at least partially said orifice, and a regulating member adapted to obturate at least partially the outlet from said by-pass, whereby when the variations of opening of said orifice produce variations of pressure in said third chamber, said variations in pressure actuate said regulating member so that variations of pressure in said by-pass result in variations of flow in said first conduit, and vice versa.

13. An apparatus of the character described as claimed in claim 1, wherein the pressure-balancing means comprises two chambers, one of which is connected to the first conduit leading to the volumetric meter, while the other one is connected to the by-pass, a movable partition separating said two chambers, a third chamber having an orifice, means controlled by the displacements of said movable partition for obturating at least partially said orifice, and a diaphragm bounding said third chamber and adapted to obturate at least partially the outlet from said by-pass, whereby when the variations of opening of said orifice produce variations of pressure in said third chamber, said variations in pressure actuate said diaphragm, so that variations of pressure in said by-pass result in variations of flow in said first conduit, and vice versa.

14. An apparatus of the character described as claimed in claim 1, wherein the pressure-balancing means comprises two chambers, one of which is connected to the first conduit leading to the volumetric meter, while the other one is connected to the by-pass, a movable partition separating said two chambers, a third chamber having an orifice, means controlled by the displacements of said movable partition for obturating at least partially said orifice, and a piston bounding said third chamber and adapted to obturate at least partially the outlet from said by-pass, whereby when the variations of opening of said orifice produce variations of pressure in said third chamber, said variations in pressure actuate said piston, so that variations of pressure in said by-pass result in variations of flow in said first conduit, and vice versa.

15. An apparatus of the character described as claimed in claim 1, wherein the pressure-balancing means comprises two chambers, one of which is connected to the first conduit leading to the volumetric meter, while the other one is connected to the by-pass, a movable partition separating said two chambers, a third chamber having an orifice, means controlled by the displacements of said movable partition for obturating at least partially said orifice, a regulating member adapted to obturate at least partially the outlet from said by-pass and a damping device between said movable partition and said regulating member, whereby when the variations of opening of said orifice produce variations of pressure in said third chamber, said variations in pressure actuate said regulating member through the medium of said damping device so that variations of pressure in said by-pass result in variations of flow in said first conduit, and vice versa.

16. An apparatus of the character described as claimed in claim 1, wherein the pressure-balancing means comprises two chambers, one of which is connected to the first conduit leading to the volumetric meter, while the other one is connected to the by-pass, a movable partition separating said two chambers, a third chamber having an orifice, means controlled by the displacements of said movable partition for obturating at least partially said orifice, a regulating member adapted to obturate at least partially the outlet from said by-pass and a damper between said movable partition and said regulating member, said damper comprising a piston fixedly connected with either said movable partition or said regulating member and sliding in a cylinder fixedly connected to the other of said two members, whereby when the variations of opening of said orifice produce variations of pressure in said two chambers, said variations in pressure actuate said regulating member through the medium of said damper so that variations of pressure in said by-pass result in variations of flow in said first conduit, and vice versa.

17. An apparatus of the character described as claimed in claim 1, wherein the pressure-balancing means comprises two chambers one of which is connected to the first conduit leading to the volumetric meter, while the other one is connected to the by-pass, a movable partition separating said two chambers, a third chamber having an orifice, means controlled by the displacements of said movable partition for obturating at least partially said orifice, a regulating member adapted to obturate at least partially the outlet from said by-pass, and a spring-loaded valve located in said first conduit leading to the volumetric meter and designed to create a resistance to the passage of the flowing liquid, which resistance is at least equal to that of the by-pass, whereby when the variations of opening of said orifice produce variations of pressure in said third chamber, said variations in pressure actuate said regulating member so that variations of pressure in said by-pass result in variations of flow in said first conduit, and vice versa.

LOUIS GAILLOUD.

No references cited.